US010997306B2

(12) United States Patent
Grabois et al.

(10) Patent No.: US 10,997,306 B2
(45) Date of Patent: May 4, 2021

(54) DATA PROTECTION AND THREAT DETECTION

(71) Applicant: Accenture Global Solutions Limited, Dublin (IE)

(72) Inventors: Dani Grabois, Tel Aviv (IL); Yair Karmy, Ramat Tzvi (IL); Asaf Cohen, Yokneam Moshava (IL); Roee Schreiber, Pardes Hanna Karkur (IL)

(73) Assignee: Accenture Global Solutions Limited, Dublin (IE)

( * ) Notice: Subject to any disclaimer, the term of this patent is extended or adjusted under 35 U.S.C. 154(b) by 365 days.

(21) Appl. No.: 16/201,161

(22) Filed: Nov. 27, 2018

(65) Prior Publication Data

US 2020/0167491 A1 May 28, 2020

(51) Int. Cl.
*H04L 29/06* (2006.01)
*G06F 21/62* (2013.01)
*G06F 21/56* (2013.01)

(52) U.S. Cl.
CPC ........ *G06F 21/6209* (2013.01); *G06F 21/566* (2013.01); *G06F 21/568* (2013.01); *G06F 2221/033* (2013.01); *G06F 2221/2133* (2013.01); *G06F 2221/2149* (2013.01)

(58) Field of Classification Search
CPC ...... H04L 63/20; H04L 67/306; G06F 21/316
See application file for complete search history.

(56) References Cited

U.S. PATENT DOCUMENTS

| 5,335,346 A * | 8/1994 | Fabbio | G06F 21/6218 |
| | | | 711/163 |
| 2017/0085587 A1* | 3/2017 | Turgeman | G06F 3/03547 |
| 2019/0260755 A1* | 8/2019 | Thexton | H04L 63/20 |

* cited by examiner

*Primary Examiner* — Jason K Gee
(74) *Attorney, Agent, or Firm* — Harrity & Harrity, LLP

(57) ABSTRACT

A device may obtain user activity data associated with a plurality of processes being run by the device, where the user activity data identifies user interactions with one or more user input devices, where the plurality of processes is associated with a plurality of process identifiers, and where the user activity data is associated with the plurality of process identifiers. The device may detect an attempt, initiated by a first process having a first process identifier, to access a data file of a file system, and may compare the first process identifier and the plurality of process identifiers to determine whether the first process is associated with a first user interaction included in the user activity data, and may selectively grant the first process access to the data file based on determining whether the first process is associated with the first user interaction.

20 Claims, 11 Drawing Sheets

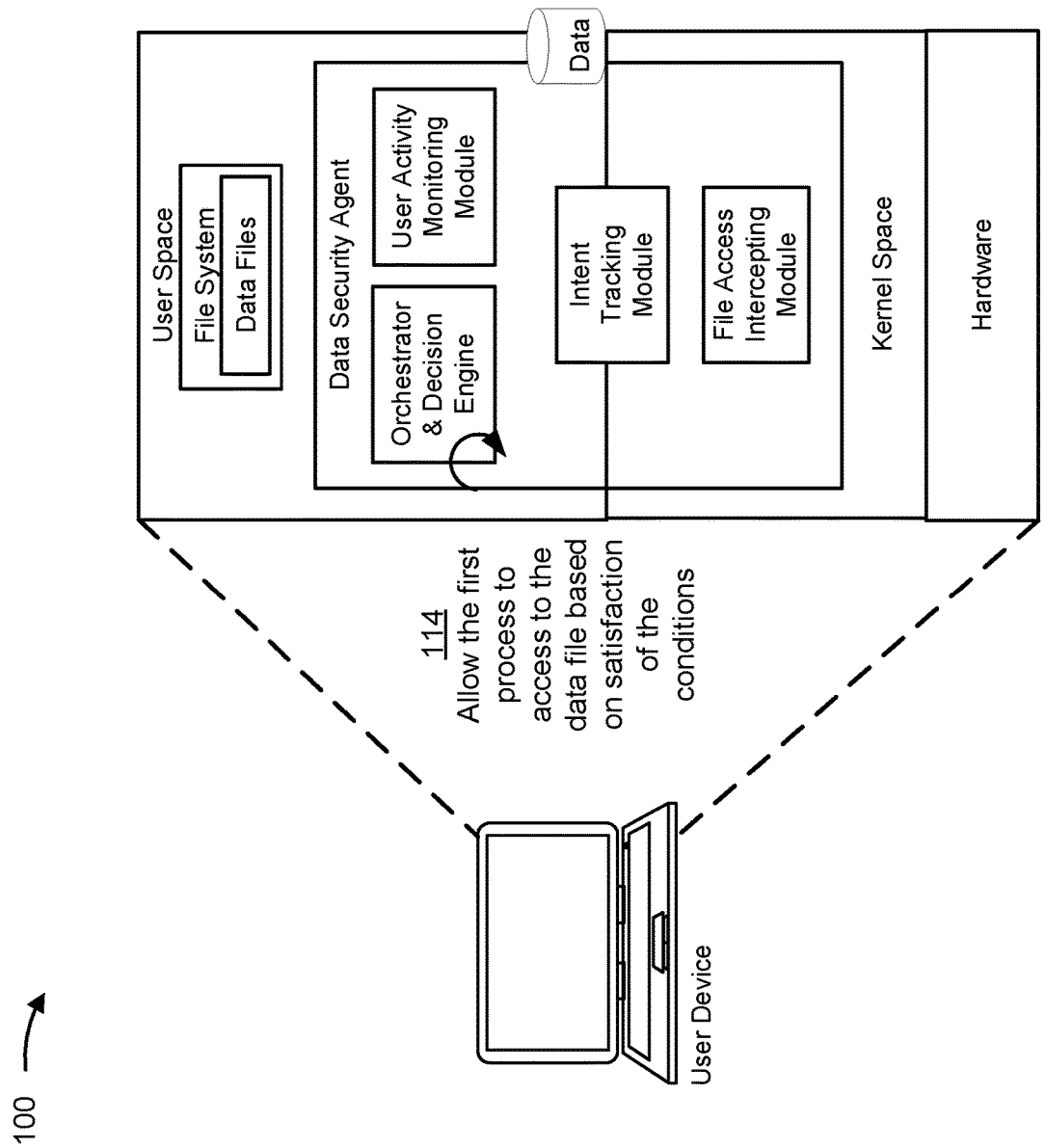

DATA PROTECTION AND THREAT DETECTION

BACKGROUND

Malicious software, known as malware, is software that is intentionally designed to damage and/or gain unauthorized access to data stored on a computing device, a server, a network, or another device. Many different types of malware exist, including viruses, Trojan horses, worms, spyware, ransomware, and logic bombs. Malware may be disguised as a legitimate program or application that installs on a device and maliciously accesses the device when inadvertently downloaded by a user.

SUMMARY

According to some possible implementations, a method may include obtaining, by a device, user activity data associated with a plurality of processes being run by the device, wherein the user activity data identifies user interactions with one or more user input devices, wherein the plurality of processes is associated with a plurality of process identifiers, and wherein the user activity data is associated with the plurality of process identifiers. The method may include detecting, by the device, an attempt to access a data file of a file system, wherein the attempt is initiated by a first process having a first process identifier, and comparing, by the device, the first process identifier and the plurality of process identifiers. The method may include determining, by the device, whether the first process is associated with a first user interaction included in the user activity data based on a first result of comparing the first process identifier and the plurality of process identifiers, and selectively granting, by the device, the first process access to the data file based on determining whether the first process is associated with the first user interaction.

According to some possible implementations, a device may include one or more memories, and one or more processors, communicatively coupled to the one or more memories, to obtain user activity data associated with a plurality of processes being run by the device, wherein the user activity data identifies user interactions with one or more user input devices, wherein the plurality of processes is associated with a plurality of process identifiers, and wherein the user activity data is associated with the plurality of process identifiers. The one or more processors may obtain historic data, wherein the historic data includes a plurality of file identifiers associated with a plurality of data files previously accessed by a plurality of past processes, and wherein the plurality of past processes corresponds to a plurality of past process identifiers. The one or more processors may detect an attempt to access a data file of a file system, wherein the attempt is initiated by a first process having a first process identifier, and obtain a file identifier associated with the data file. The one or more processors may compare the first process identifier and the plurality of process identifiers to determine whether the first process is associated with a first user interaction included in the user activity data, and compare the file identifier and the plurality of file identifiers to determine whether the file identifier is associated with a past process identifier. The one or more processors may compare the first process identifier and the past process identifier to determine whether the first process identifier matches the past process identifier based on a result of comparing the file identifier and the past process identifier, and selectively grant access to the data file to the first process based on a first result of determining whether the first process is associated with the first user interaction, or a second result of determining whether the first process identifier matches the past process identifier.

According to some possible implementations, a non-transitory computer-readable medium may store instructions that include one or more instructions that, when executed by one or more processors of a device, cause the one or more processors to obtain user activity data associated with a plurality of processes being run by a device, wherein the user activity data identifies user interactions with one or more user input devices, wherein the plurality of processes is associated with a plurality of process identifiers, and wherein the user activity data is associated with the plurality of process identifiers. The one or more instructions may cause the one or more processors to detect an attempt to access a data file of a file system, wherein the attempt is initiated by a first process having a first process identifier. The one or more instructions may cause the one or more processors to obtain command-line data, wherein the command-line data includes a portion of computer code used to initiate the first process, and determine that a second process invoked the first process based on the command-line data, wherein the second process is associated with a second process identifier. The one or more instructions may cause the one or more processors to compare the first process identifier and the plurality of process identifiers to determine whether the first process is associated with a first user interaction included in the user activity data, and compare the second process identifier and the plurality of process identifiers to determine whether the second process is associated with a second user interaction included in the user activity data. The one or more instructions may cause the one or more processors to selectively grant access to the data file to the first process based on a first result of determining whether the first process is associated with the first user interaction, or a second result of determining whether the second process is associated with the second user interaction.

BRIEF DESCRIPTION OF THE DRAWINGS

FIGS. 1A-1F are diagrams of an example implementation described herein.

DETAILED DESCRIPTION

Figure 1A:
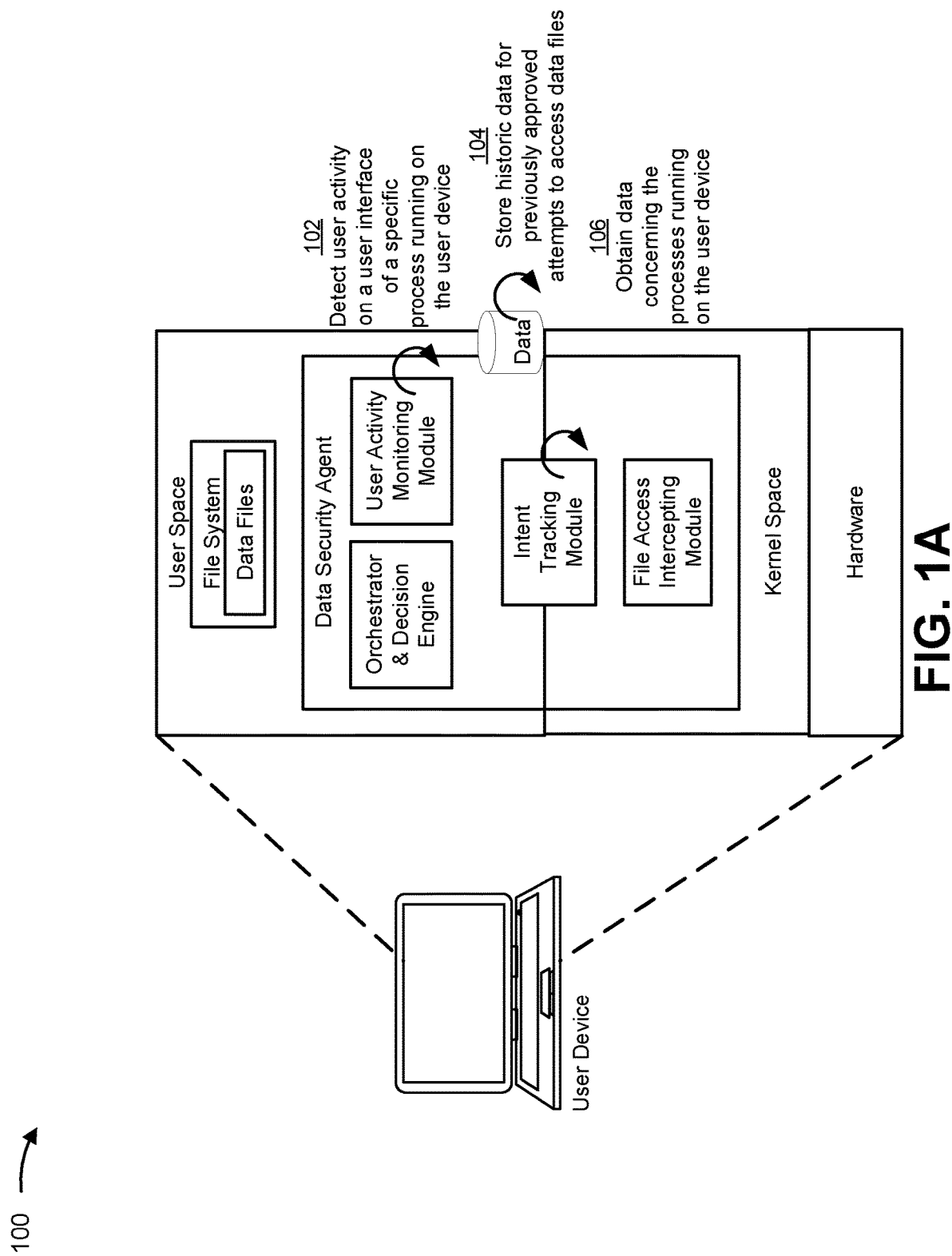

The following detailed description of example implementations refers to the accompanying drawings. The same reference numbers in different drawings may identify the same or similar elements.

Cybercriminals may attempt to gain access to data on target devices by causing malware to be installed on the target devices. Various strategies exist for protecting target devices from being infected with malware. One strategy includes installing an antivirus software, firewall, or other type of software-based security solution on a target device, whereby the software-based security solution analyzes traffic coming into the target device by comparing signatures or sockets associated with the incoming traffic to signatures or sockets associated with known malware. Other software-based security solutions scan data files stored by a target device to detect portions of code that may be associated with known malware. When a signature, socket, and/or portion of code associated with known malware is detected, the software-based security solution may attempt to block, quarantine, and/or eradicate the malware. Existing software-based security solutions, however, fail to block, quarantine, and/or eradicate all occurrences of malware, which renders data stored on a device inherently vulnerable to being accessed by malware. Existing software-based security solutions fail to protect data at a point in time at which the data is accessed. Accordingly, existing software-based security solutions may fail to protect data from being accessed by malware.

Some implementations described herein provide a data security agent installed on a user device. The data security agent may protect data files stored on the user device by way of determining whether attempts (e.g., data file access attempts, and/or the like) to access the data files were initiated by and/or originated by a human user of the user device. The data security agent may obtain user activity data for a plurality of processes running on the user device and correlate the user activity data to attempts to access the data files. By correlating the user activity data and attempts to access the data files, the data security agent may determine whether an attempt to access a data file was originated by a human user (e.g., the human user of the user device that physically and/or locally interacts with the user device). In this way, the data file may be prevented from being accessed by malware. In this way, the data security agent may additionally, or alternatively, detect threats to data security where, for example, the data security agent determines that a process is attempting to access one or more data files, and that the process may not be associated with user activity data. In this way, computing resources (e.g., processors, memory, etc.) that would otherwise be devoted to detecting and/or preventing malware by way of analyzing traffic communicated to a user device and/or scanning data files stored on the user device may be reduced and/or obviated. In this way, an elegant method may be used to protect data on a user device by way of obtaining user activity data, historic data, and/or command-line data for a process, and determining whether to allow the process access to a data file, which does not consume and/or rely heavily on processing resources. In this way, computing resources that would otherwise be required to obtain, analyze, scan, and/or the like, traffic and/or files on a user device may be reduced or obviated.

FIGS. 1A-1F are diagrams of an example implementation 100 described herein. As shown in FIGS. 1A-1F, implementation 100 may include a user device and a data security agent installed on the user device. Implementation 100 may, additionally, or alternatively, include a management server configured to communicate with the user device and/or the data security agent by wired or wireless connections, as described herein.

In some implementations, the data security agent may be stored in a memory of the user device and may be executed by a processor of the user device. In some implementations, the user device may include, for example, a computer (e.g., a desktop computer, a laptop computer, and/or the like), a tablet, a phone, a wearable computer (e.g., a smart wristwatch, a pair of smart eyeglasses, and/or the like), and/or the like. In some implementations, the user device may include hardware (e.g., the processor, the memory, and/or the like) that supports and/or executes a kernel space and a user space. The hardware may execute the data security agent in the kernel space, the user space, and/or a combination of the kernel space and the user space. For example, the hardware may execute the data security agent in the user space by which the data security agent may obtain user activity data, historic data, and/or command-line data, associated with processes attempting to access data files stored in a file system executing in the user space. As another example, the hardware may execute the data security agent in the kernel space to detect an attempt by a process to access a data file system of the user device. In this way, the data security agent may be included and/or incorporated with an operating system executing in the kernel space, and provide a more robust and secure data security solution.

In some implementations, the data security agent may include a file access intercepting module configured to obtain information associated with attempts to access data files, a user activity monitoring module configured to obtain and/or monitor user activity data associated with the user device and/or processes executing on the user device, an intent tracking module configured to track processes attempting to access data files by detecting how the processes are invoked (e.g., via the command-line data) and/or events (e.g., start events, end events, access events, etc.) associated with the processes attempting to access the data files, and an orchestrator and decision engine configured to determine whether access to a data file should be granted (e.g., allowed) or denied (e.g., blocked), based on a result of correlating the user activity data, the historic data, and/or the command-line data to the processes attempting to access the data files, and/or the events associated with the processes attempting to access the data files. In this way, the data security agent may selectively grant access to a data file based, at least in part, on the user activity data, the historic data, and/or the command-line data, which may prevent the data file from being accessed by malware, as malware may be devoid of user activity data, historic data, and/or command-line data as described herein. Additionally, or alternatively, in some implementations, the data security agent may detect a threat (e.g., a security threat, malware, and/or the like), or a process indicative of a threat, based on determining that a process lacks user activity data, historic data, and/or command-line data satisfying one or more conditions or rules as described herein. Example data files may include and/or be associated with a document, a spreadsheet, a data structure, an electronic-mail message, a video, an image, and/or the like.

Turning to FIG. 1A, as shown by reference number 102, the data security agent may detect user activity on a user interface of a specific process running on the user device. In some implementations, the data security agent may obtain user activity data (e.g., data concerning detected user activity events) associated with multiple processes (e.g., computer programs, and/or the like) executing on the user device. In some implementations, the data security agent may obtain process identifiers (e.g., alphanumeric characters, numbers, sequences of numbers, one or more pathnames, and/or the like, that uniquely identify a process) associated with the multiple processes executing on the user device, and information relating to user activities associated with the process identifiers. Example user activities may include activities associated with a user's interaction (e.g., a human user's local interaction, and/or the like) with an input device of the user device, such as an interaction with a keyboard, a mouse, a touch screen, a microphone, and/or the like. As described herein, the data security agent may utilize the user activity data to determine whether to grant or deny a process access to a data file. In this way, attempts to access a data file by processes lacking local, physical user activity data (e.g., malware) may be denied access to the data file, quarantined, blocked, and/or the like. In this way, the security associated with protecting data files stored on a user device may be improved.

In some implementations, the user activity data may be obtained by way of a computing application, a computing program, a computing function, a computing call, and/or the like, implemented by the data security agent. For example, the user activity monitoring module of the data security agent may implement a hook, or a hook procedure, to obtain user activity data associated with a user interaction with the user device and/or a user interaction with a process executing on the user device. The user activity data may include an indication of the user interaction (e.g., an indication of a keystroke, a mouse click, and/or the like), a process identifier associated with the user interaction, timestamp information (e.g., a day, a time (e.g., a minute, second, hour), and/or the like) associated with the user interaction, and/or the like. In some implementations, the hook may be used to intercept user activity data from a process server, interprocess communications (IPCs), and/or the like, and such user activity data may correspond to the user interactions, such as mouse interactions (e.g., mouse clicks, mouse wheel scrolls, mouse coordinates, and/or the like), keyboard interactions (e.g., key presses, key releases, and/or the like), touch screen interactions (e.g., a touch contact position, pressure information, and/or the like), and/or the like. The user activity data obtained by the hook may be associated with one or more process identifiers and/or timestamp information.

In some implementations, the data security agent may correlate a user interaction and a process that has a process identifier. For example, the data security agent may correlate a time at which the user interaction occurred (e.g., via the timestamp information, and/or the like), and a start time and an end time associated with the process having the process identifier. As described herein, the data security agent may allow the process to access the data file when a user interaction occurred at or between the start time and the end time associated with the process having the process identifier. In this way, the data security agent may determine that a human user interacted with the user device to initiate the process that is requesting access to the data file and, therefore, likely corresponds to a legitimate request to access the data file.

In some implementations, the data security agent may store (e.g., in a data structure, such as a table, a database, and/or the like), as user activity data, a plurality of process identifiers, user interactions associated with the plurality of process identifiers, and time data associated with the user interactions. In this way, the data security agent may perform a lookup of the user interactions, based on the process identifiers, to determine whether a user interaction, for a process requesting access to a data file, occurred proximate to a time at which the process requested access to the data file. In this way, processes that lack user interactions, and/or user activity data indicative of user interactions, may be denied access to the data file. In this way, the data file may be better protected from access by malware. In this way, user interactions for a secondary process, which may be related to the process requesting access to the data file (e.g., a parent process, and/or the like), may additionally, or alternatively, be determined so that the process requesting access to the data file may be allowed to access the data file based on the user activity data associated with the related process.

As further shown by FIG. 1A, and by reference number 104, the data security agent may obtain and/or store, as historic data, data associated with previously approved attempts of past processes to access data files. In some implementations, the previously approved attempts may have been approved by the data security agent. In some implementations, the historic data may be stored in a data structure of the data security agent. As described herein, and in some implementations, the data security agent may utilize the historic data when determining whether to grant a process access to a data file. In some implementations, the historic data may include a plurality of file identifiers (e.g., a plurality of file numbers (e.g., process ID numbers associated with the data files), sequences of numbers, file names, pathnames for files, and/or the like, to uniquely identify a data file), associated with a plurality of data files that were previously accessed by a plurality of past processes. The plurality of past processes may correspond to a plurality of past process identifiers. In some implementations, the data security agent may allow a process to access a data file, when, for example, a file identifier associated with the data file matches one of the plurality of file identifiers included in the historic data, and when a process identifier associated with the process attempting to access the data file matches a past process identifier included in the historic data. In this way, the data security agent may determine, based on the historic data, that a pair of present identifiers, including the file identifier and the process identifier, matches a pair of past identifiers, including one of the plurality of file identifiers and one of the plurality of past process identifiers, which the data security agent may determine to be a proven, safe, and/or otherwise legitimate request to access the data file.

As further shown by FIG. 1A, and by reference number 106, the data security agent may obtain data concerning the processes, such as command-line data, running on the user device. In some implementations, the command-line data may be used alone or in combination with the user activity data, to determine whether a process should be granted or allowed access to a data file. In some implementations, the command-line data may include one or more portions of computer code (e.g., lines of code, identifiers (e.g., file identifiers, path identifiers, process identifiers, and/or the like) contained in the code, snippets of code, and/or the like) used to initiate or invoke a process requesting access to a data file, which the data security agent may use in determining whether the process was initiated or invoked by way of a legitimate, alternative process (e.g., a parent process, a Remote Procedure Call (RPC), an Application Programming Interface (API) call, an alternative data stream (e.g., an NTFS stream, and/or the like), and/or the like. In some implementations, the alternative process may be associated with user activity data that may be obtained, monitored, and/or stored by the data security agent. The user activity data may be associated with the alternative process by way of a process identifier, in some implementations.

In some implementations, the command-line data obtained by the data security agent may include data obtained from a Dynamic Data Exchange (DDE) communication, IPC, or other type of communication, in which the command-line data may be used to create or initiate the process requesting access to a data file. For example, the data security agent may determine, based on the presence of a second process identifier contained in the command-line data associated with a first process requesting access to a data file, that a second process invoked the first process. In this example, the data security agent may obtain user activity data associated with the second process, based on the second process identifier, and approve the request to access the data file when the second process identifier is associated with and/or includes user activity data. In some implementations, the user activity data may indicate the occurrence of a user interaction, associated with the second process, at or between a start time and an end time associated with the second process. For example, in some implementations, the command-line data obtained by the data security agent may include a process identifier associated with a parent process, an alternative data stream, an API call, an IPC, an RPC, and/or the like, so that the process identifier data may be used in combination with the user activity data, to determine whether the process identifier was invoked interactively, and thus, includes user activity data. In this way, an attempt to access a data file by malware, which may lack invocation by an interactive process, may be denied, blocked, and/or the like.

Figure 1B:
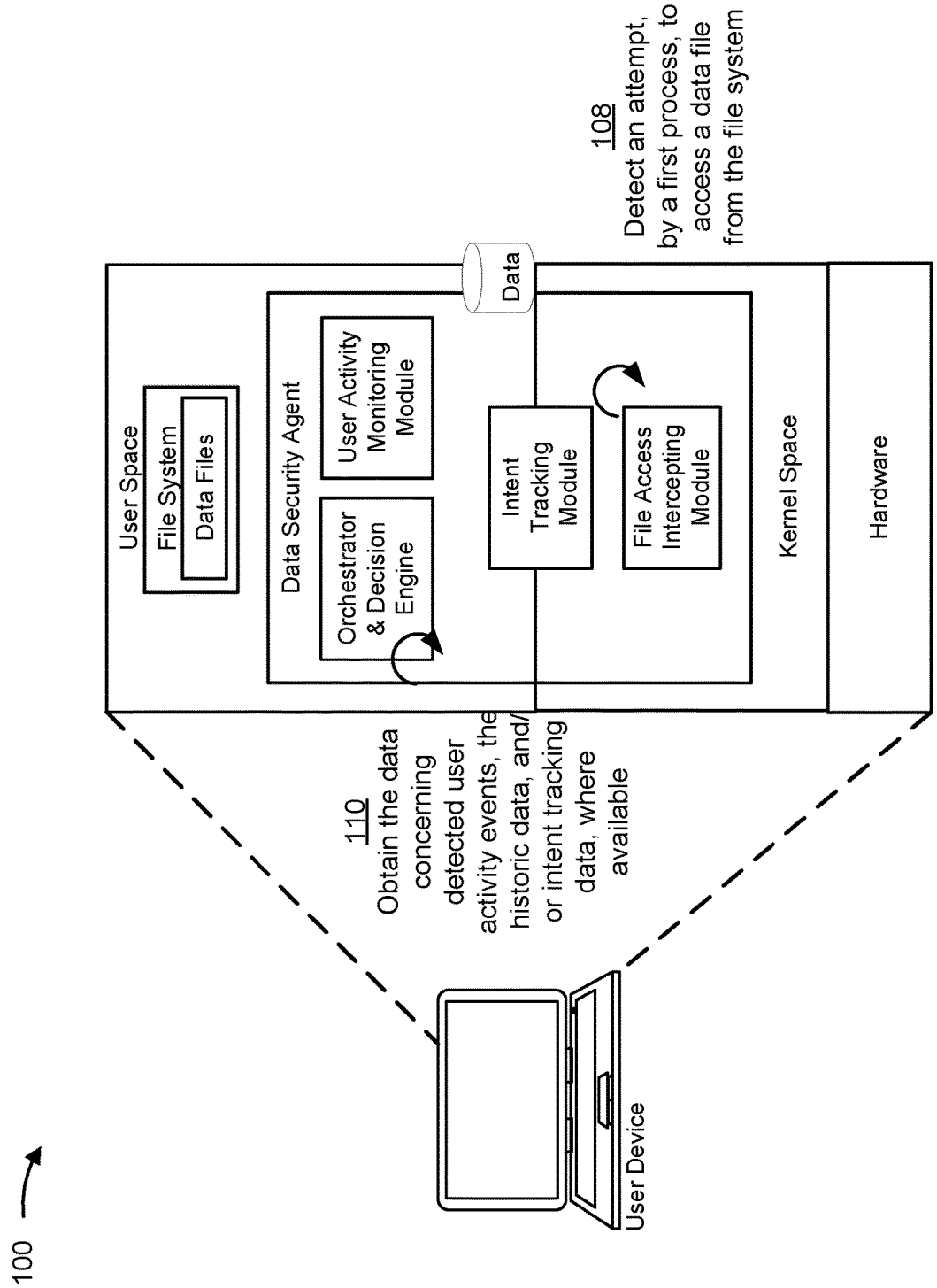

Turning to FIG. 1B, as shown by reference number 108, the data security agent may detect an attempt, by a first process, to access a data file from the file system executing in the user space of the user device. In some implementations, the data security agent may monitor the file system and/or a path to the data file in the file system to identify the attempt to access the data file. For example, the data security agent may monitor file system objects, events, or code (e.g., objects, events, or code that cause the data file to be accessed, and/or the like) to detect the attempt to access the data file. In some implementations, the file access intercepting module of the data security agent may generate an event or trigger based on detecting the attempt, by the first process, to access the data file. The event or trigger may prompt the data security agent to determine whether to allow or deny the first process access to the data file based on the user activity data, historic data, and/or command-line data, associated with the first process, as described herein.

As further shown by FIG. 1B, and by reference number 110, the orchestrator and decision engine, of the data security agent, may obtain user activity data, such as the data concerning detected user activity events, the historic data, and/or intent tracking data (e.g., the data concerning the processes, such as the command-line data for the first process attempting to access the data file, and/or the like). For example, the orchestrator and decision engine may obtain the user activity data, the historic data, and/or the command-line data for the first process based on a lookup or mapping of a first process identifier (i.e., associated with the first process) and the user activity data, the historic data, and/or the command-line data. In some implementations, the orchestrator and decision engine may grant the first process access to the data file, or deny the first process access to the data file, based on the user activity data, the historic data, and/or the command-line data. As an example, the orchestrator and decision engine may obtain the user activity data, the historic data, and/or the command-line data, associated with the first process, from a data structure accessible to the data security agent, a memory or storage element of the user device, a server accessible to the data security agent (e.g., a DDE interception server associated with the data security agent, a process interactivity server associated with the data security agent, and/or the like), an API interface, and/or the like.

Figure 1C:
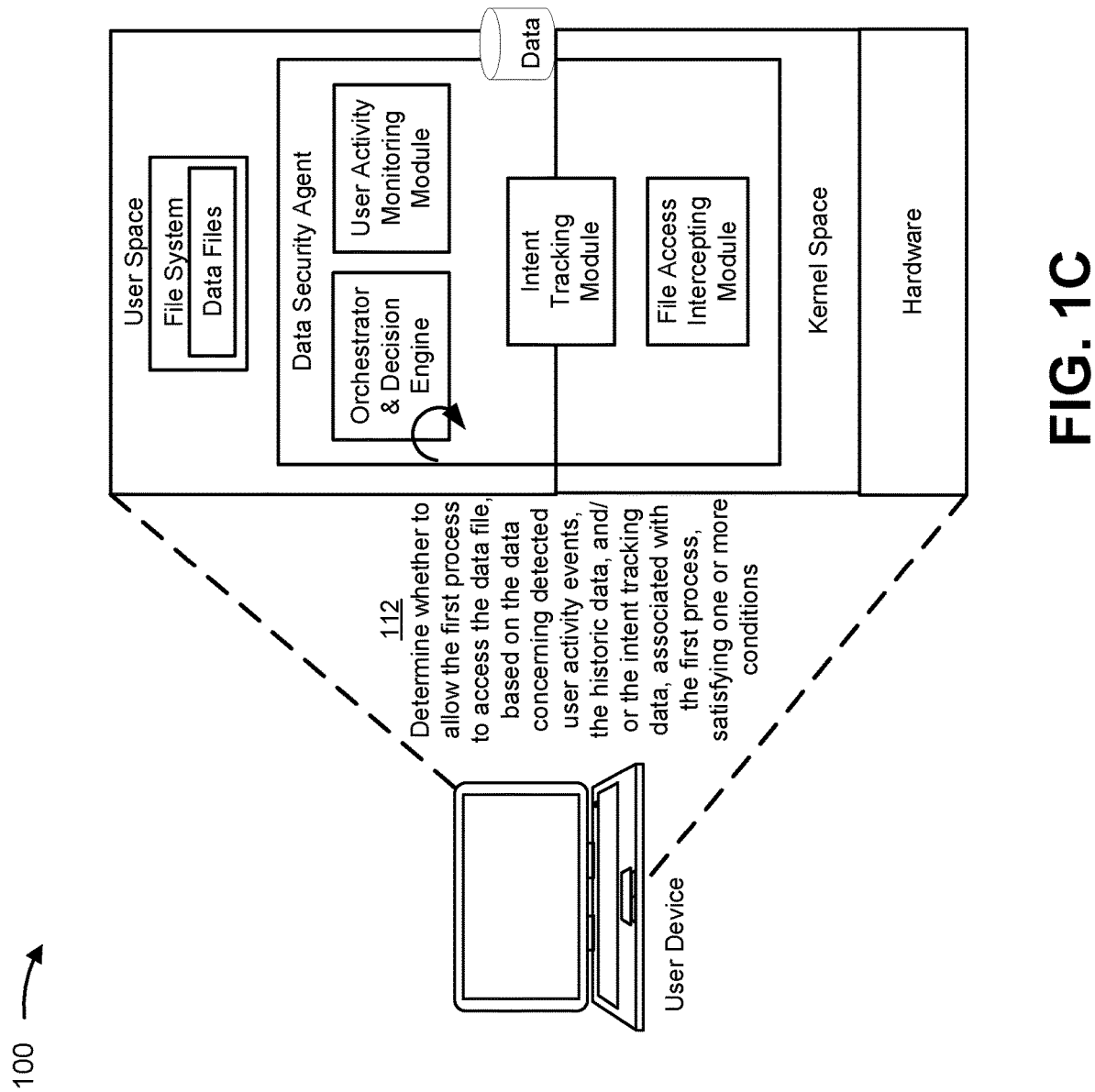

Turning to FIG. 1C, as shown by reference number 112, the data security agent may determine whether to allow the first process access to the data file based on the user activity data, such as the data concerning detected user activity events, the historic data, and/or the intent tracking data (e.g., the data concerning the processes, such as the command-line data, and/or the like), associated with the first process, satisfying one or more conditions. For example, and according to a first condition, the data security agent may grant the first process access to the data file where the first process is associated with user activity data. In this example, the data security agent may determine that a user interaction (e.g., a keyboard interaction, a mouse interaction, and/or the like) associated with a first process identifier, of the first process, occurred at or between a start time and an end time associated with the first process. In some implementations, the user interaction may occur proximate to a time at which the first process attempted to access the data file. In this case, the data security agent may allow the first process to access the data file. As another example, and, according to a second condition, the data security agent may allow the first process to access the data file when a file identifier associated with the data file being accessed matches one of the plurality of past file identifiers included in the historic data, and when the first process identifier, associated with the first process attempting to access the data file, matches a past process identifier included in the historic data. In this case, the data security agent may obtain the file identifier associated with the data file prior to comparing the file identifier associated with the data file and the plurality of past file identifiers included in the historic data. As another example, and, according to a third condition, the data security agent may allow the first process to access the data file when the first process was invoked by a second process (e.g., a parent process, an API call, an RPC call, a NTFS stream, and/or the like), and when the second process is an interactive process associated with user activity data. In this way, attempts to access the data file by malware, which lacks user activity data, historic data, and/or a second, interactive process associated with user activity data, may be denied, blocked, and/or the like.

Turning to FIG. 1D, as shown by reference number 114, the data security agent may allow the first process access to the data file based on satisfaction of the one or more conditions and/or rules. As indicated above, for example, where the first process, or a second, interactive process associated with the first process, is associated with user activity data based on an identifier for the first process or the second, interactive process, the data security agent may allow the first process to access the data file. Similarly, where a combination of a file identifier, associated with the data file being accessed, and the first process identifier, match a combination of a previously accessed file identifier and a past process identifier, the data security agent may determine to allow the first process access to the data file. In this way, the security associated with accessing and/or storing data files on a user device may improve. In this way, computing resources that would otherwise be devoted to identifying malware by way of scanning the data files and/or analyzing traffic inbound to the user device may be reduced and/or obviated. Further, in this way, the data security agent may determine whether each attempt to access a data is legitimate, in near-real time, thus, providing a robust and efficient device and method for protecting data on the user device.

Figure 1E:
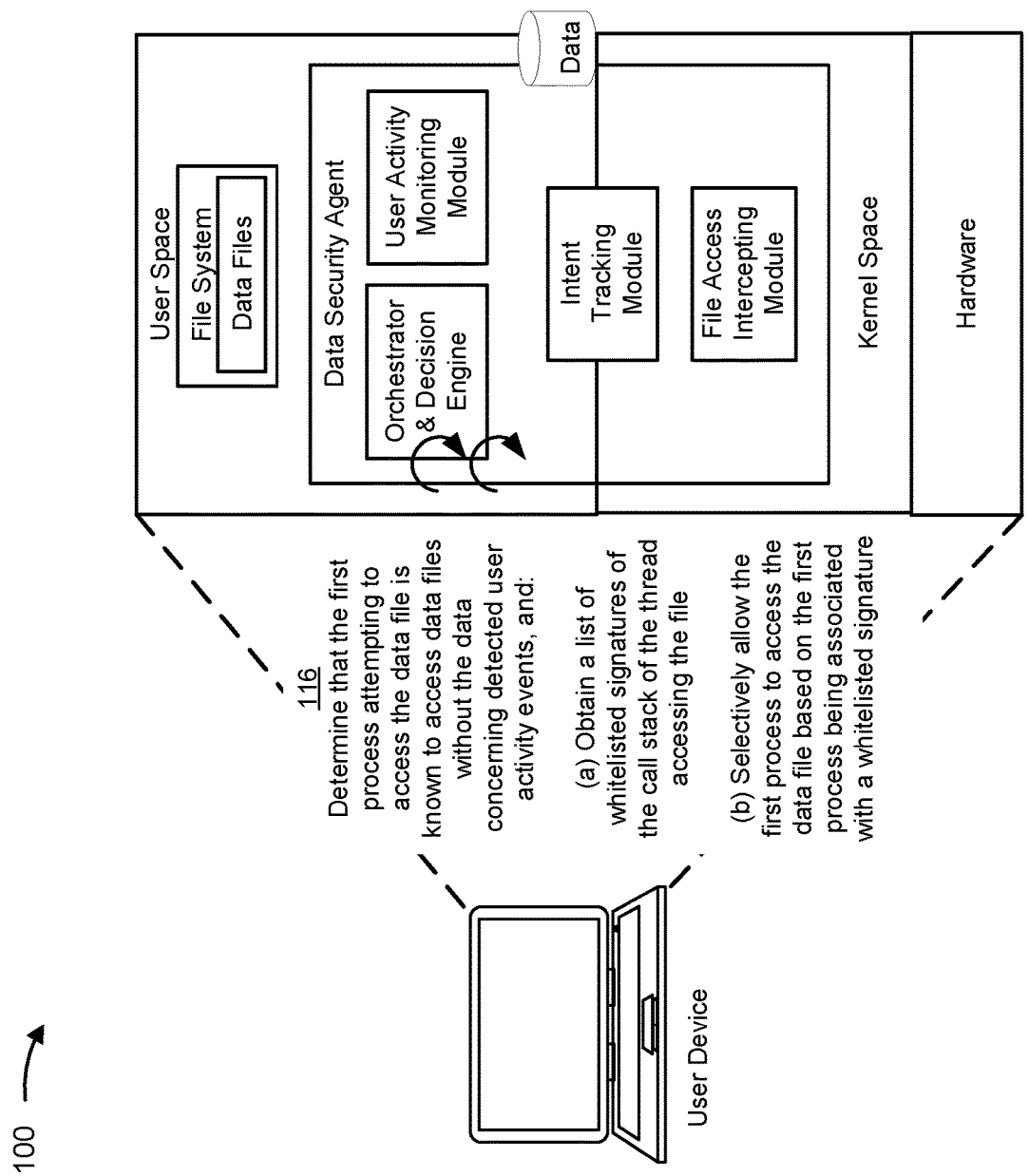

Turning to FIG. 1E, as shown by reference number 116, the data security agent may, additionally, or alternatively, determine that the first process attempting to access the data file corresponds to a process known to access data files non-interactively. That is, in some cases, the first process may be included in a list of processes known to access data files automatically (e.g., e-mail programs, and/or the like) and/or without user interaction, so that the processes may be devoid of user activity data. In this case, the data security agent may obtain a list of non-interactive process identifiers, where non-interactive process identifiers, included in the list of non-interactive process identifiers, may be associated with whitelisted call signatures (e.g., a signature may concern thread call stack data associated with a non-interactive process identifier prior to accessing the non-interactive process identifier). In this example, the data security agent may compare the first process identifier and the non-interactive process identifiers to determine whether the first process identifier is associated with a whitelisted call signature. Additionally, the data security agent may obtain thread call stack data associated with the first process identifier, based on determining that the first process identifier is associated with a whitelisted call signature, and compare the thread call stack data and the whitelisted call signature. In some implementations, the data security agent may grant the first process access to the data file when the thread call stack data matches the whitelisted call signature. In some implementations, the data security agent may compare the first process identifier and the non-interactive process identifiers to determine whether the first process identifier is associated with a whitelisted call signature prior to obtaining user activity data, historic data, and/or command-line data.

Figure 1F:
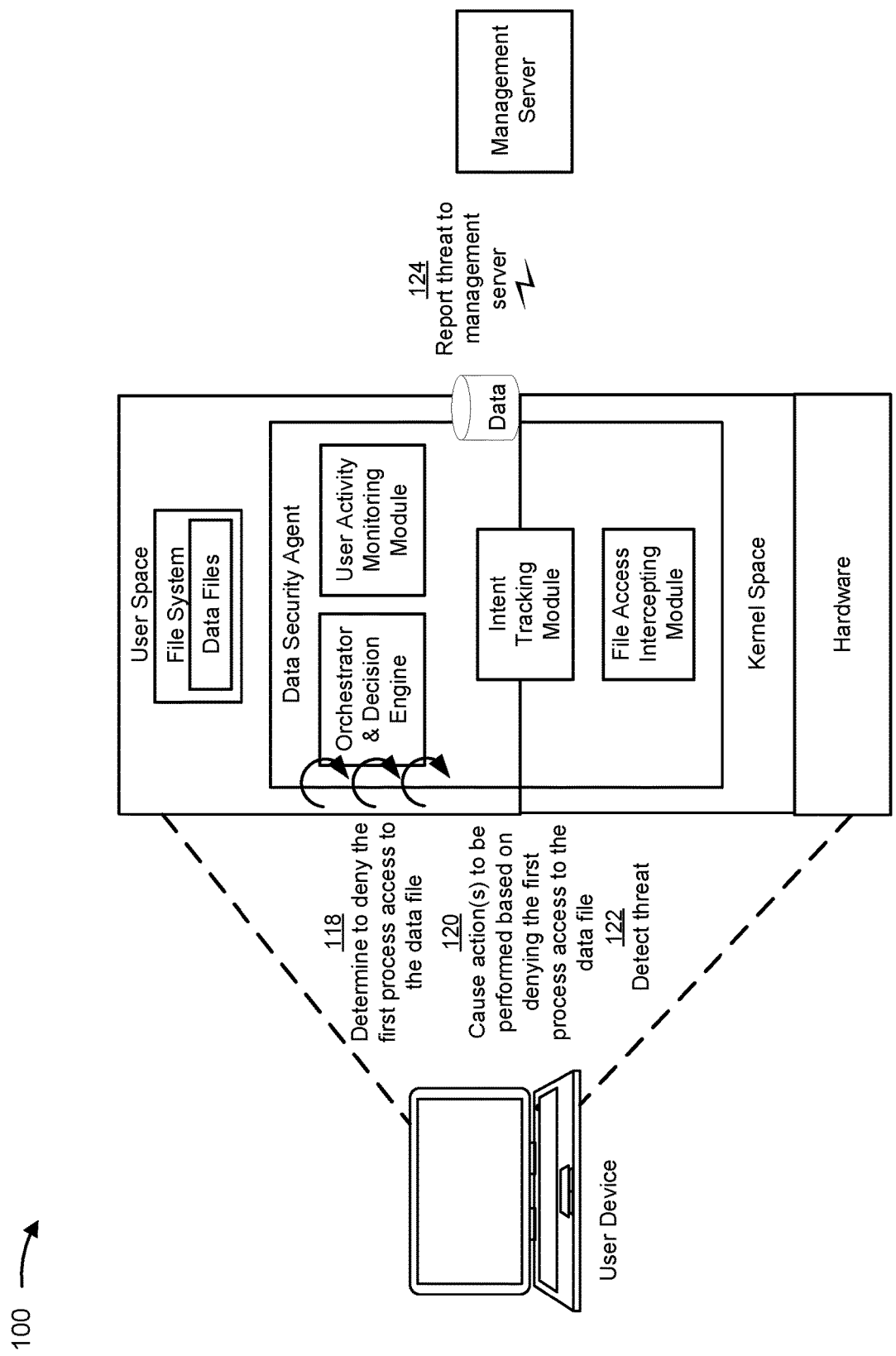

Turning to FIG. 1F, as shown by reference number 118, the data security agent may determine to deny the first process access to the data file. For example, the data security agent may deny the first process access to the data file, when the first process lacks user activity data, lacks historic data, and/or lacks command-line data that satisfies one or more conditions as described above. In some implementations, the data security agent may deny the first process access to the data file when the first process identifier fails to be included in a list of non-interactive process identifiers and/or when the thread call stack associated with the first process fails to match a whitelisted call signature. In this way, malware, or other malicious software, may be prevented from accessing the data file. In this way, the security of data stored on the user device may be improved.

As further shown by FIG. 1F, and by reference number 120, the data security agent may cause one or more actions to be performed based on denying the first process access to the data file. Example actions include blocking all attempts to access the data file, blocking all attempts by the first process to access any and/or all files, deleting the first process, deleting the data file, quarantining the first process, quarantining the data file, logging attempts to access data files, generating and sending alerts to a management server based on logging the attempts, sending the first process and/or information relating to the first process to a remote device (e.g., a remote server, and/or the like) for deeper inspection, obtaining a list of data files (e.g., or file identifiers) that the first process may have previously accessed and/or attempted to access, undoing whatever actions that first process may have taken since execution (e.g., determinable by way of the start time), and/or the like.

As further shown by FIG. 1F, and by reference number 122, the data security agent may detect a threat. In some implementations, the threat may be detected and/or identified by way of the data security agent logging access attempts, and monitoring the logged access attempts. For example, in some implementations, the data security agent may obtain data relating to processes attempting to access data files, and log the data relating to the processes accessing data files (e.g., logging the process identifier, the path identifier, the file identifier, timestamp information and/or the like). Continuing with this example, the data security agent may additionally obtain data related to processes being denied access to data files, and log the data related to the processes being denied access to the data files (e.g., logging the process identifier, the path identifier, the file identifier, the reason for denial, timestamp information, and/or the like). In some implementations, the data security agent may detect a threat (e.g., a security threat, malware, and/or the like) based on the log data. For example, where the data security agent determines that a same process identifier is repeatedly denied access to multiple data files based on a lack of user activity data, the user activity data failing to satisfy one or more conditions, a lack of historic data, the historic data failing to satisfy one or more conditions, a lack of command-line data, the command-line data failing to satisfy one or more conditions, and/or the like, the data security agent may deem the process associated with the same process identifier to be a threat. Upon detecting a threat, the data security agent may perform one or more actions, such as deleting the process corresponding to the same process identifier, quarantining the process corresponding to the same process identifier, reporting the threat to the management server, and/or the like.

As further shown by FIG. 1F, and by reference number 124, the data security agent may report the threat to the management server. Upon the management server receiving information regarding the threat, the management server may push down updates to other user devices for mitigating the threat. The updates pushed down by the management server may include the process identifier, and instructions to delete, terminate, and/or quarantine processes having the process identifier. In this way, threats detected by the user device may be prevented from affecting other user devices. Additionally, in some implementations, the management server may obtain a list of blacklisted call signatures for one or more process identifiers, and push down the blacklisted call signatures, and/or update a list of blacklisted call signature. In this implementation, the management server may specify instructions for the data security agent to perform when detecting a blacklisted call signature, such as deleting the process executing the blacklisted call signature, reporting the process executing the blacklisted call signature, and/or the like.

In this way, access to data files may be determined based on user activity data, historic data, command-line data, and/or the like, which may prevent data files from being accessed by malware. In this way, computing resources (e.g., processors, memory, etc.) that would otherwise be devoted to detecting malware by way of analyzing traffic communicated to a user device and/or scanning data files stored on the user device may be reduced and/or obviated. In this way, the speed and efficiency at which the data security agent may determine whether to allow access to a data file may improve and conserve computing resources (e.g., processor resources, memory resources, and/or the like) that would otherwise be wasted in obtaining and comparing signatures, sockets, executable code, and/or the like, to known malicious signatures, sockets, executable code, and/or the like. Finally, determining whether to allow access to a data file at a point in time at which the data file is being accessed conserves computing resources (e.g., processor resources, memory resources, and/or the like) that would otherwise be wasted in attempting to combat malware.

As indicated above, FIGS. 1A-1F are provided merely as an example. Other examples are possible and may differ from what was described with regard to FIGS. 1A-1F.

Figure 2:
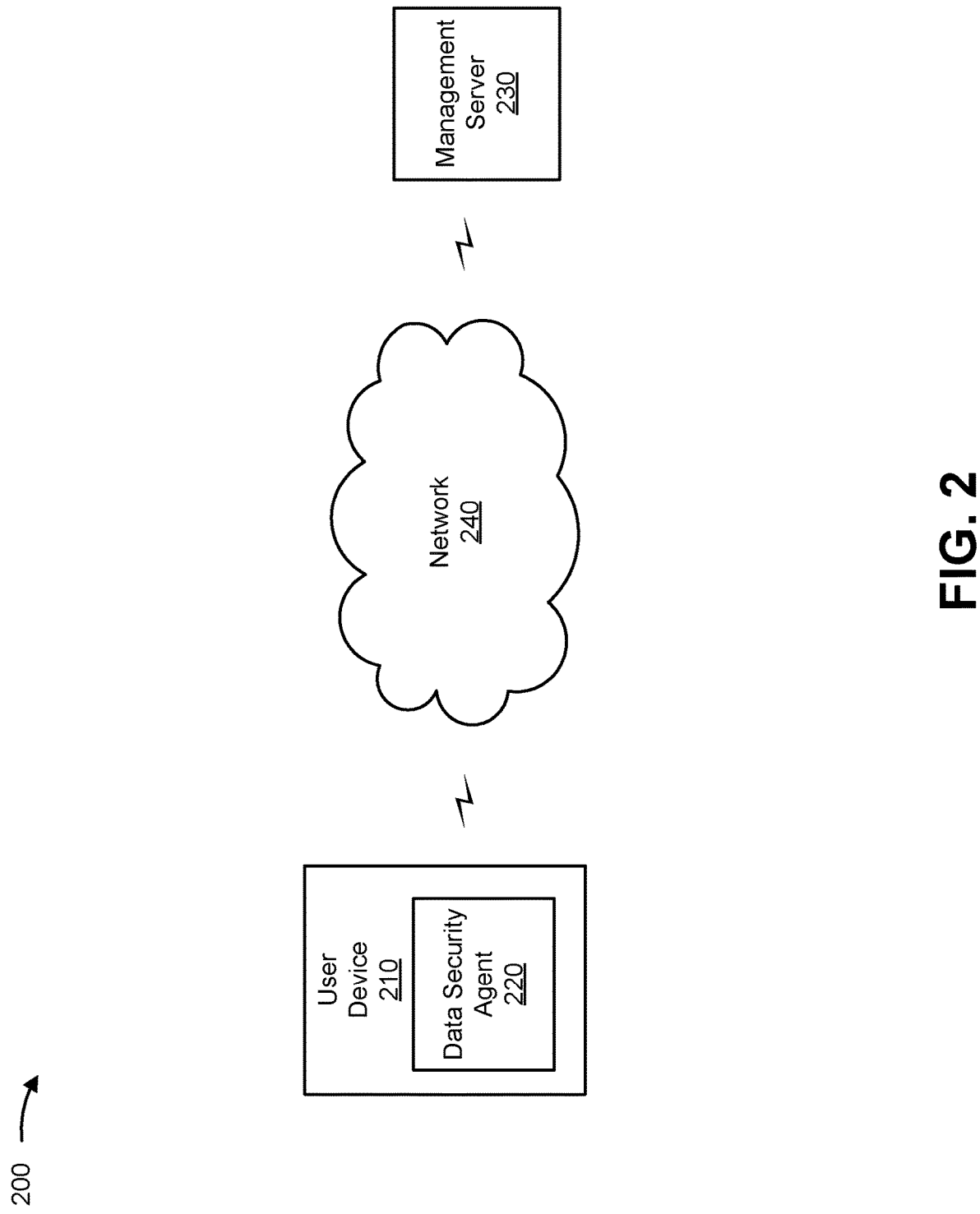
FIG. 2 is a diagram of an example environment in which devices and/or methods, described herein, may be implemented.

FIG. 2 is a diagram of an example environment 200 in which systems and/or methods, described herein, may be implemented. As shown in FIG. 2, environment 200 may include one or more user devices 210, a data security agent 220, a management server 230, and a network 240. Devices of environment 200 may interconnect via wired connections, wireless connections, or a combination of wired and wireless connections.

User device 210 includes one or more devices capable of sending, receiving, generating, storing, processing, and/or providing information associated with providing data protection and/or threat detection. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Data security agent 220 is implemented on a user device 210 is capable of sending, receiving, generating, storing, processing, and/or providing information associated with providing data protection and/or threat detection. In some implementations, data security agent 220 includes a software agent or engine that may be stored in a memory of user device 210 and executed by a processor of user device 210. For example, data security agent 220 may include an orchestrator and decision engine, a user activity monitoring module, a file access intercepting module, and an internet tracking module as described above, which may collectively allow or deny a process access to a data file based on user activity data, historic data, command-line data, and/or a combination thereof, as described above. In some implementations, data security agent 220 may be executed in a kernel space of user device 210. In some implementations, data security agent 220 may be implemented on another device, such as management server 230 or another security device in communication with user device 210. In some implementations, data security agent is partially implemented on user device 210 and partially implemented on another device.

Management server 230 includes one or more devices capable of sending, receiving, generating, storing, processing, and/or providing information associated with data protection and threat detection. For example, management server 230 may include a server device (e.g., a host server, a web server, an application server, etc.), a data center device, a cloud computing device, or a similar device. In some implementations, management server 230 may be capable of communicating with user device 210 via network 240. In some implementations, management server 230 and user device 210 may communicate information regarding threats, security updates, and/or the like via network 240.

Network 240 includes one or more wired and/or wireless networks. For example, network 240 may include a private network, an ad hoc network, an intranet, the Internet,), a local area network (LAN), a wide area network (WAN), a cellular network (e.g., a long-term evolution (LTE) network, a code division multiple access (CDMA) network, a 3G network, a 4G network, a 5G network, another type of next generation network, etc.), a public land mobile network (PLMN), a metropolitan area network (MAN), a telephone network (e.g., the Public Switched Telephone Network (PSTN)), an ad hoc network, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
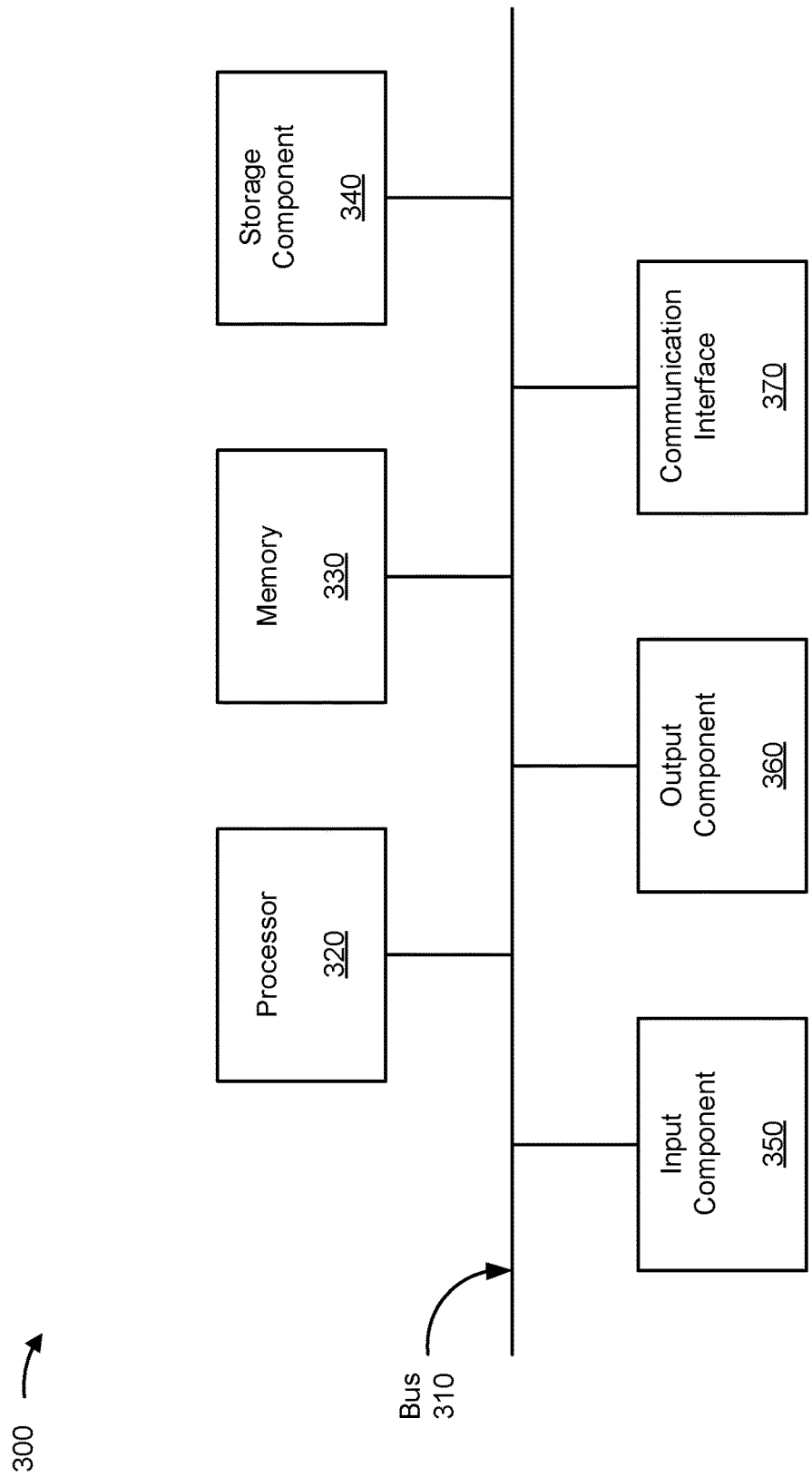
FIG. 3 is a diagram of example components of one or more devices of FIG. 2.

FIG. 3 is a diagram of example components of a device 300. Device 300 may correspond to user device 210 and/or management server 230. In some implementations, user device 210 and/or management server 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
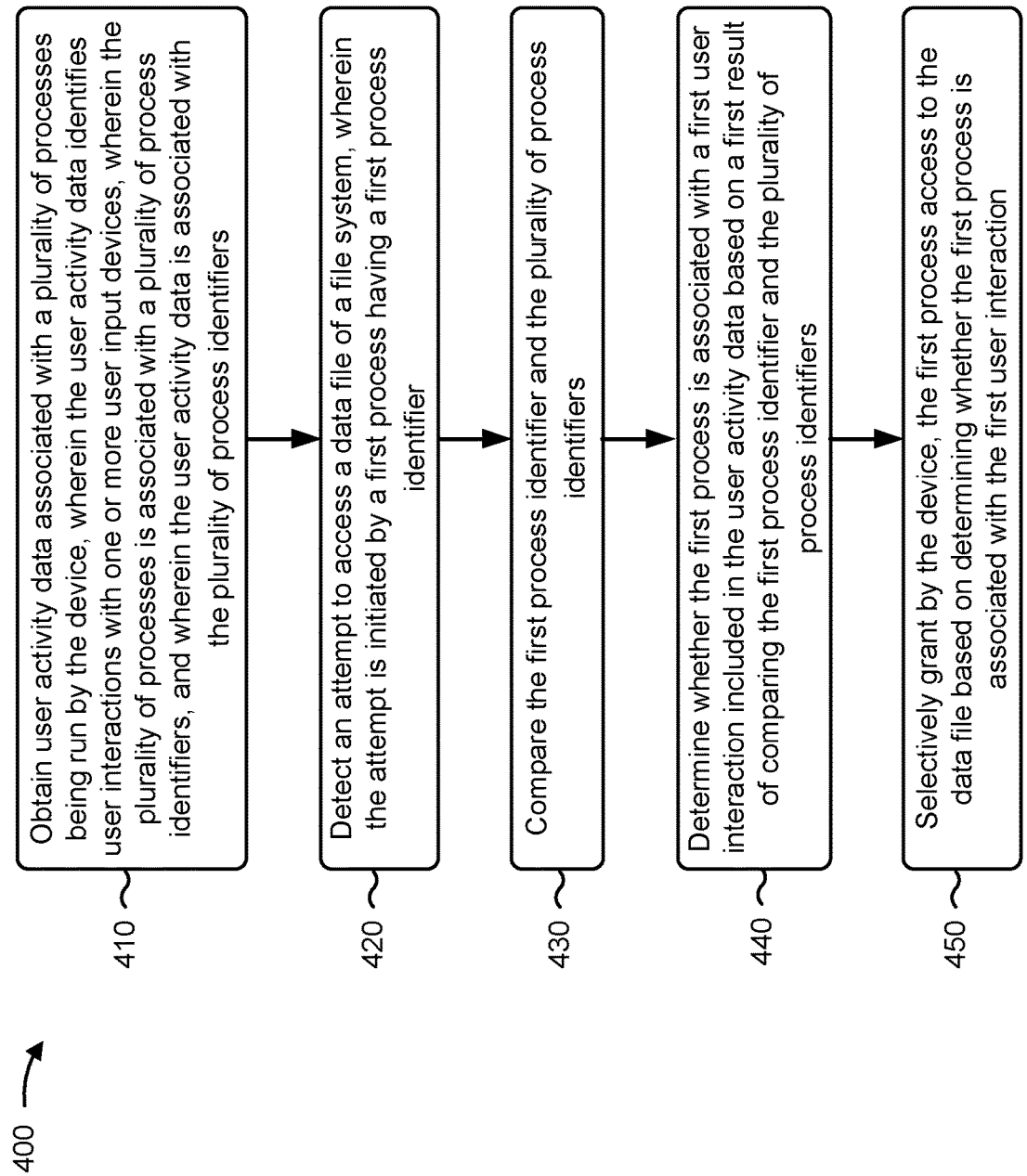
FIG. 4 is a flow chart of an example process for providing data protection and/or threat detection.

FIG. 4 is a flow chart of an example process for providing data protection and/or threat detection. In some implementations, one or more process blocks of FIG. 4 may be performed by a device, such as a user device (e.g., user device 210) implementing a data security agent (e.g., data security agent 220). In some implementations, one or more process blocks of FIG. 4 may be performed by another device or a group of devices separate from or including the device, such as a user device (e.g., user device 210) and/or a management server (e.g., management server 230).

As shown in FIG. 4, process 400 may include obtaining user activity data associated with a plurality of processes being run by the device, wherein the user activity data identifies user interactions with one or more user input devices, wherein the plurality of processes is associated with a plurality of process identifiers, and wherein the user activity data is associated with the plurality of process identifiers (block 410). For example, the device (e.g., using processor 320, memory 330, storage component 340, input component 350, communication interface 370, and/or the like) may obtain user activity data associated with a plurality of processes being run by the device, as described above in connection with FIGS. 1A-1F. In some implementations, the user activity data may identify user interactions with one or more user input devices, the plurality of processes may be associated with a plurality of process identifiers, and the user activity data may be associated with the plurality of process identifiers.

As further shown in FIG. 4, process 400 may include detecting an attempt to access a data file of a file system, wherein the attempt is initiated by a first process having a first process identifier (block 420). For example, the device (e.g., using processor 320, memory 330, storage component 340, communication interface 370, and/or the like) may detect an attempt to access a data file of a file system, as described above in connection with FIGS. 1A-1F. In some implementations, the attempt may be initiated by a first process having a first process identifier.

As further shown in FIG. 4, process 400 may include comparing the first process identifier and the plurality of process identifiers (block 430). For example, the device (e.g., using processor 320, memory 330, storage component 340, and/or the like) may compare the first process identifier and the plurality of process identifiers, as described above in connection with FIGS. 1A-1F.

As further shown in FIG. 4, process 400 may include determining whether the first process is associated with a first user interaction included in the user activity data based on a first result of comparing the first process identifier and the plurality of process identifiers (block 440). For example, the device (e.g., using processor 320, memory 330, storage component 340, and/or the like) may determine whether the first process is associated with a first user interaction included in the user activity data based on a first result of comparing the first process identifier and the plurality of process identifiers, as described above in connection with FIGS. 1A-1F.

As further shown in FIG. 4, process 400 may include selectively granting the first process access to the data file based on determining whether the first process is associated with the first user interaction (block 450). For example, the device (e.g., using processor 320, memory 330, storage component 340, output component 360, communication interface 370, and/or the like) may selectively grant the first process access to the data file based on determining whether the first process is associated with the first user interaction, as described above in connection with FIGS. 1A-1F.

Process 400 may include additional implementations, such as any single implementation or any combination of implementations described below and/or in connection with one or more other processes described elsewhere herein.

In some implementations, the one or more user input devices may include a keyboard, a mouse, a microphone, or a touch screen. In some implementations, the first process identifier may be associated with a start time and an end time, and the first user interaction may have occurred at or between the start time and the end time.

In some implementations, the device may determine that the first process is not associated with the first user interaction, may obtain a file identifier associated with the data file, and may obtain historic data, where the historic data includes a plurality of file identifiers associated with a plurality of data files previously accessed by a plurality of past processes, and where the plurality of past processes correspond to a plurality of past process identifiers. Additionally, the device may compare the file identifier and the plurality of file identifiers, may obtain a past process identifier associated with the file identifier based on a second result of comparing the file identifier and the plurality of file identifiers, may compare the first process identifier and the past process identifier, and may grant access to the data file when the first process identifier matches the past process identifier.

In some implementations, the device may determine that the first process is not associated with the first user interaction, may obtain command-line data, where the command-line data includes a portion of computer code used to initiate the first process, and may determine that a second process invoked the first process based on the command-line data, where the second process is associated with a second process identifier. Additionally, the device may compare the second process identifier and the plurality of process identifiers, may determine whether the second process is associated with a second user interaction included in the user activity data based on a second result of comparing the second process identifier and the plurality of process identifiers, and may selectively grant access to the data file to the first process based on determining whether the second process is associated with the second user interaction.

In some implementations, the device may obtain a file identifier associated with the data file, may determine whether a portion of the file identifier is present in the command-line data, and may grant access to the data file based on determining that the second process is associated with the second user interaction, and that the portion of the file identifier is present in the command-line data.

In some implementations, the device may determine that the first process is not associated with the first user interaction, may obtain a list of non-interactive process identifiers, where non-interactive process identifiers, included in the list of non-interactive process identifiers, are associated with whitelisted call signatures, and may compare the first process identifier and the non-interactive process identifiers to determine whether the first process identifier is associated with a whitelisted call signature. Additionally, the device may obtain thread call stack data associated with the first process identifier based on determining whether the first process identifier is associated with the whitelisted call signature, may compare the thread call stack data and the whitelisted call signature, and may grant access to the data file to the first process when the thread call stack data matches the whitelisted call signature.

In some implementations, the device may determine that the first process is not associated with the first user interaction, and may cause an action to be performed based on determining that the first process is not associated with the first user interaction, where the action includes denying access to the data file to the first process, deleting the data file, quarantining the data file, or generating and sending an alert.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
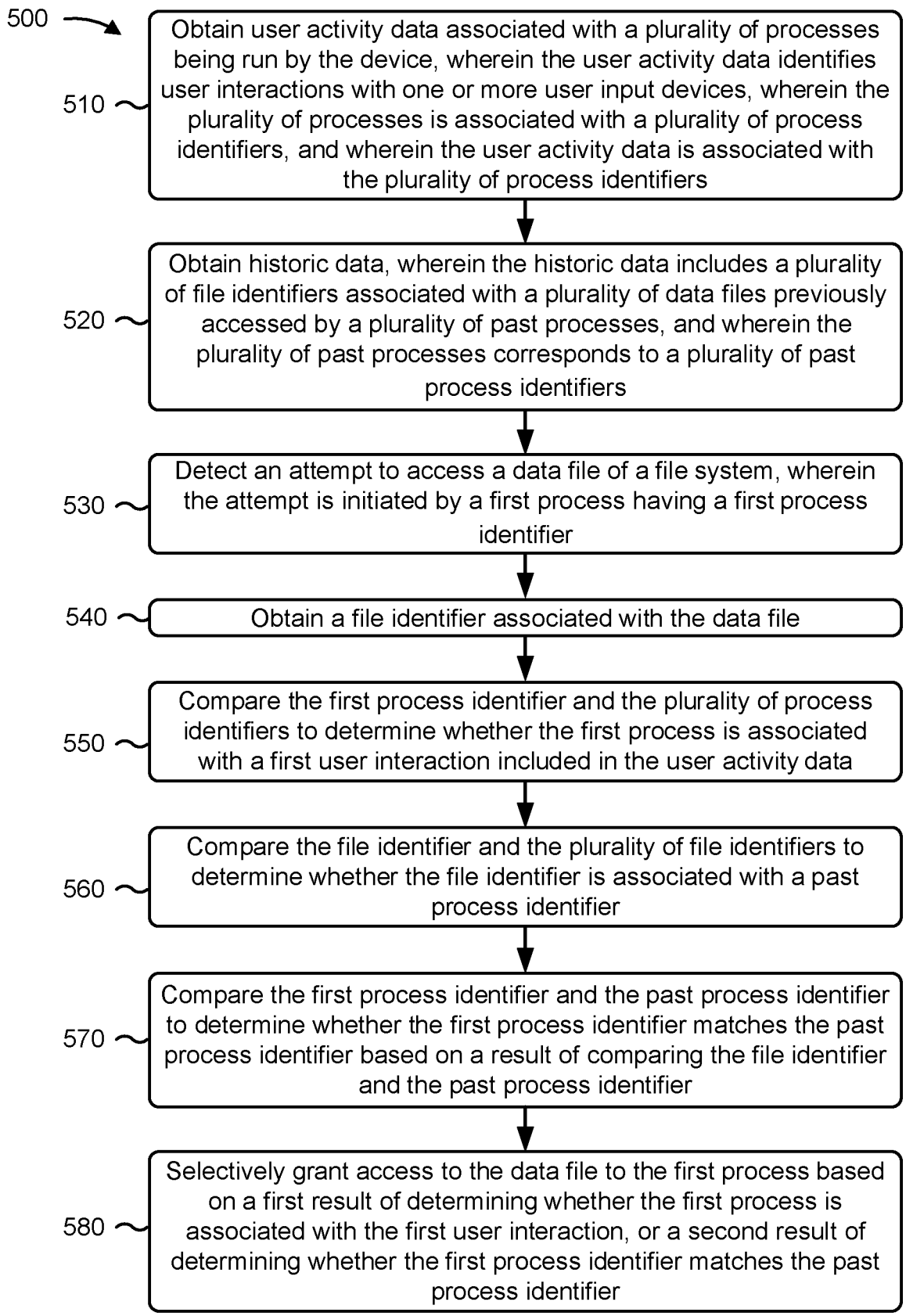
FIG. 5 is a flow chart of an example process for providing data protection and/or threat detection.

FIG. 5 is a flow chart of an example process 500 for providing data protection and/or threat detection. In some implementations, one or more process blocks of FIG. 5 may be performed by a device, such as a user device (e.g., user device 210) implementing a data security agent (e.g., data security agent 220). In some implementations, one or more process blocks of FIG. 5 may be performed by another device or a group of devices separate from or including the device, such as a user device (e.g., user device 210) and/or a management server (e.g., management server 230).

As shown in FIG. 5, process 500 may include obtaining user activity data associated with a plurality of processes being run by the device, wherein the user activity data identifies user interactions with one or more user input devices, wherein the plurality of processes is associated with a plurality of process identifiers, and wherein the user activity data is associated with the plurality of process identifiers (block 510). For example, the device (e.g., using processor 320, memory 330, storage component 340, input component 350, communication interface 370, and/or the like) may obtain user activity data associated with a plurality of processes being run by the device, as described above in connection with FIGS. 1A-1F. In some implementations, the user activity data may identify user interactions with one or more user input devices, the plurality of processes may be associated with a plurality of process identifiers, and the user activity data may be associated with the plurality of process identifiers.

As further shown in FIG. 5, process 500 may include obtaining historic data, wherein the historic data includes a plurality of file identifiers associated with a plurality of data files previously accessed by a plurality of past processes, and wherein the plurality of past processes corresponds to a plurality of past process identifiers (block 520). For example, the device (e.g., using processor 320, memory 330, storage component 340, input component 350, communication interface 370, and/or the like) may obtain historic data, as described above in connection with FIGS. 1A-1F. In some implementations, the historic data may include a plurality of file identifiers associated with a plurality of data files previously accessed by a plurality of past processes, and the plurality of past processes may correspond to a plurality of past process identifiers.

As further shown in FIG. 5, process 500 may include detecting an attempt to access a data file of a file system, wherein the attempt is initiated by a first process having a first process identifier (block 530). For example, the device (e.g., using processor 320, memory 330, storage component 340, communication interface 370, and/or the like) may detect an attempt to access a data file of a file system, as described above in connection with FIGS. 1A-1F. In some implementations, the attempt may be initiated by a first process having a first process identifier.

As further shown in FIG. 5, process 500 may include obtaining a file identifier associated with the data file (block 540). For example, the device (e.g., using processor 320, memory 330, storage component 340, input component 350, communication interface 370, and/or the like) may obtain a file identifier associated with the data file, as described above in connection with FIGS. 1A-1F.

As further shown in FIG. 5, process 500 may include comparing the first process identifier and the plurality of process identifiers to determine whether the first process is associated with a first user interaction included in the user activity data (block 550). For example, the device (e.g., using processor 320, memory 330, storage component 340, and/or the like) may compare the first process identifier and the plurality of process identifiers to determine whether the first process is associated with a first user interaction included in the user activity data, as described above in connection with FIGS. 1A-1F.

As further shown in FIG. 5, process 500 may include comparing the file identifier and the plurality of file identifiers to determine whether the file identifier is associated with a past process identifier (block 560). For example, the device (e.g., using processor 320, memory 330, storage component 340, and/or the like) may compare the file identifier and the plurality of file identifiers to determine whether the file identifier is associated with a past process identifier, as described above in connection with FIGS. 1A-1F.

As further shown in FIG. 5, process 500 may include comparing the first process identifier and the past process identifier to determine whether the first process identifier matches the past process identifier based on a result of comparing the file identifier and the past process identifier (block 570). For example, the device (e.g., using processor 320, memory 330, storage component 340, and/or the like) may compare the first process identifier and the past process identifier to determine whether the first process identifier matches the past process identifier based on a result of comparing the file identifier and the past process identifier, as described above in connection with FIGS. 1A-1F.

As further shown in FIG. 5, process 500 may include selectively granting access to the data file to the first process based on a first result of determining whether the first process is associated with the first user interaction, or a second result of determining whether the first process identifier matches the past process identifier (block 580). For example, the device (e.g., using processor 320, memory 330, storage component 340, output component 360, communication interface 370, and/or the like) may selectively grant access to the data file to the first process based on a first result of determining whether the first process is associated with the first user interaction, or a second result of determining whether the first process identifier matches the past process identifier, as described above in connection with FIGS. 1A-1F.

Process 500 may include additional implementations, such as any single implementation or any combination of implementations described below and/or in connection with one or more other processes described elsewhere herein.

In some implementations, the one or more user input devices may include a keyboard, a mouse, a microphone, or a touch screen. In some implementations, the data file may be associated with a document, a spreadsheet, a data structure, an electronic-mail message, a video, or an image.

In some implementations, the device may obtain command-line data, where the command-line data includes a portion of computer code used to initiate the first process, and may determine that a second process invoked the first process based on the command-line data, where the second process is associated with a second process identifier. Additionally, the device may compare the second process identifier and the plurality of process identifiers, may determine whether the second process is associated with a second user interaction included in the user activity data based on a third result of comparing the second process identifier and the plurality of process identifiers, and may selectively grant access to the data file to the first process based on determining whether the second process is associated with the second user interaction.

In some implementations, the device may obtain a list of non-interactive process identifiers, where non-interactive process identifiers, included in the list of non-interactive process identifiers, are associated with whitelisted call signatures, and may compare the first process identifier and the non-interactive process identifiers to determine whether the first process identifier is associated with a whitelisted call signature. Additionally, the device may obtain thread call stack data associated with the first process identifier based on determining whether the first process identifier is associated with the whitelisted call signature, may compare the thread call stack data and the whitelisted call signature, and may grant access to the data file to the first process when the thread call stack data matches the whitelisted call signature.

In some implementations, the device may deny access to the data file to the first process based on the first result or the second result, and may cause an action to be performed based on denying access to the data file. In some implementations, the action may include deleting the data file, quarantining the data file, or generating and sending an alert.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
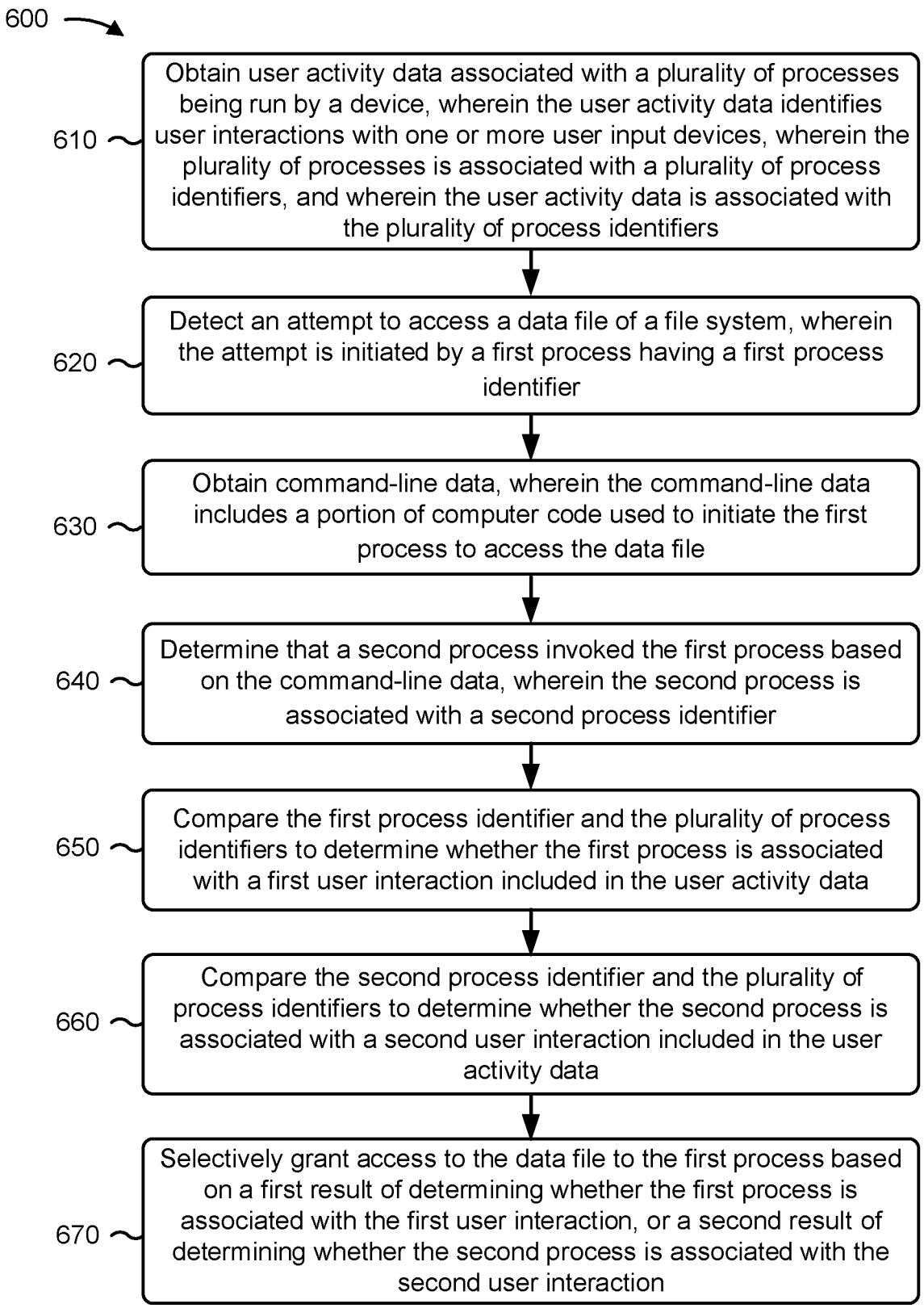
FIG. 6 is a flow chart of an example process for providing data protection and/or threat detection.

FIG. 6 is a flow chart of an example process 600 for providing data protection and/or threat detection. In some implementations, one or more process blocks of FIG. 6 may be performed by a device, such as a user device (e.g., user device 210) implementing a data security agent (e.g., data security agent 220). In some implementations, one or more process blocks of FIG. 6 may be performed by another device or a group of devices separate from or including the device, such as a user device (e.g., user device 210) and/or a management server (e.g., management server 230).

As shown in FIG. 6, process 600 may include obtaining user activity data associated with a plurality of processes being run by a device, wherein the user activity data identifies user interactions with one or more user input devices, wherein the plurality of processes is associated with a plurality of process identifiers, and wherein the user activity data is associated with the plurality of process identifiers (block 610). For example, the device (e.g., using processor 320, memory 330, storage component 340, input component 350, communication interface 370, and/or the like) may obtain user activity data associated with a plurality of processes being run by a device, as described above in connection with FIGS. 1A-1F. In some implementations, the user activity data may identify user interactions with one or more user input devices, the plurality of processes may be associated with a plurality of process identifiers, and the user activity data may be associated with the plurality of process identifiers.

As further shown in FIG. 6, process 600 may include detecting an attempt to access a data file of a file system, wherein the attempt is initiated by a first process having a first process identifier (block 620). For example, the device (e.g., using processor 320, memory 330, storage component 340, communication interface 370, and/or the like) may detect an attempt to access a data file of a file system, as described above in connection with FIGS. 1A-1F. In some implementations, the attempt may be initiated by a first process having a first process identifier.

As further shown in FIG. 6, process 600 may include obtaining command-line data, wherein the command-line data includes a portion of computer code used to initiate the first process to access the data file (block 630). For example, the device (e.g., using processor 320, memory 330, storage component 340, input component 350, communication interface 370, and/or the like) may obtain command-line data, as described above in connection with FIGS. 1A-1F. In some implementations, the command-line data may include a portion of computer code used to initiate the first process to access the data file.

As further shown in FIG. 6, process 600 may include determining that a second process invoked the first process based on the command-line data, wherein the second process is associated with a second process identifier (block 640). For example, the device (e.g., using processor 320, memory 330, storage component 340, and/or the like) may determine that a second process invoked the first process based on the command-line data, as described above in connection with FIGS. 1A-1F. In some implementations, the second process may be associated with a second process identifier.

As further shown in FIG. 6, process 600 may include comparing the first process identifier and the plurality of process identifiers to determine whether the first process is associated with a first user interaction included in the user activity data (block 650). For example, the device (e.g., using processor 320, memory 330, storage component 340, and/or the like) may compare the first process identifier and the plurality of process identifiers to determine whether the first process is associated with a first user interaction included in the user activity data, as described above in connection with FIGS. 1A-1F.

As further shown in FIG. 6, process 600 may include comparing the second process identifier and the plurality of process identifiers to determine whether the second process is associated with a second user interaction included in the user activity data (block 660). For example, the device (e.g., using processor 320, memory 330, storage component 340, and/or the like) may compare the second process identifier and the plurality of process identifiers to determine whether the second process is associated with a second user interaction included in the user activity data, as described above in connection with FIGS. 1A-1F.

As further shown in FIG. 6, process 600 may include selectively granting access to the data file to the first process based on a first result of determining whether the first process is associated with the first user interaction, or a second result of determining whether the second process is associated with the second user interaction (block 670). For example, the device (e.g., using processor 320, memory 330, storage component 340, output component 360, communication interface 370, and/or the like) may selectively grant access to the data file to the first process based on a first result of determining whether the first process is associated with the first user interaction, or a second result of determining whether the second process is associated with the second user interaction, as described above in connection with FIGS. 1A-1F.

Process 600 may include additional implementations, such as any single implementation or any combination of implementations described below and/or in connection with one or more other processes described elsewhere herein.

In some implementations, the device may obtain a file identifier associated with the data file, may determine whether a portion of the file identifier is present in the command-line data, and may grant access to the data file to the first process based on the second result of determining that the second process is associated with the second user interaction, and a third result of determining that the portion of the file identifier is present in the command-line data.

In some implementations, the device may deny access to the data file to the first process based on the first result or the second result, and may cause an action to be performed based on denying access to the data file. In some implementations, the action may include deleting the data file, quarantining the data file, or generating and sending an alert. In some implementations, the data file may be associated with a document, a spreadsheet, a data structure, an electronic-mail message, a video, or an image.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   obtaining, by a device, user activity data associated with a plurality of processes being run by the device,
      wherein the user activity data identifies user interactions with one or more user input devices,
      wherein the plurality of processes is associated with a plurality of process identifiers, and
      wherein the user activity data is associated with the plurality of process identifiers;
   detecting, by the device, an attempt to access a data file of a file system,
      wherein the attempt is initiated by a first process having a first process identifier;
   comparing, by the device, the first process identifier and the plurality of process identifiers;
   determining, by the device, whether the first process is associated with a first user interaction included in the user activity data based on a first result of comparing the first process identifier and the plurality of process identifiers; and selectively granting, by the device, the first process access to the data file based on determining whether the first process is associated with the first user interaction.

2. The method of claim 1, wherein the one or more user input devices include:
a keyboard,
a mouse,
a microphone, or
a touch screen.

3. The method of claim 1, wherein the first process identifier is associated with a start time and an end time, and
wherein the first user interaction occurred at or between the start time and the end time.

4. The method of claim 1, further comprising:
determining that the first process is not associated with the first user interaction;
obtaining a file identifier associated with the data file;
obtaining historic data,
wherein the historic data includes a plurality of file identifiers associated with a plurality of data files previously accessed by a plurality of past processes, and
wherein the plurality of past processes corresponds to a plurality of past process identifiers;
comparing the file identifier and the plurality of file identifiers;
obtaining a past process identifier associated with the file identifier based on a second result of comparing the file identifier and the plurality of file identifiers;
comparing the first process identifier and the past process identifier; and
granting access to the data file when the first process identifier matches the past process identifier.

5. The method of claim 1, further comprising:
determining that the first process is not associated with the first user interaction;
obtaining command-line data,
wherein the command-line data includes a portion of computer code used to initiate the first process;
determining that a second process invoked the first process based on the command-line data,
wherein the second process is associated with a second process identifier;
comparing the second process identifier and the plurality of process identifiers;
determining whether the second process is associated with a second user interaction included in the user activity data based on a second result of comparing the second process identifier and the plurality of process identifiers; and
selectively granting access to the data file to the first process based on determining whether the second process is associated with the second user interaction.

6. The method of claim 5, further comprising:
obtaining a file identifier associated with the data file;
determining whether a portion of the file identifier is present in the command-line data; and
granting access to the data file based on determining that the second process is associated with the second user interaction, and that the portion of the file identifier is present in the command-line data.

7. The method of claim 1, further comprising:
determining that the first process is not associated with the first user interaction;
obtaining a list of non-interactive process identifiers,
wherein non-interactive process identifiers, included in the list of non-interactive process identifiers, are associated with whitelisted call signatures;
comparing the first process identifier and the non-interactive process identifiers to determine whether the first process identifier is associated with a whitelisted call signature;
obtaining thread call stack data associated with the first process identifier based on determining whether the first process identifier is associated with the whitelisted call signature;
comparing the thread call stack data and the whitelisted call signature; and
granting access to the data file to the first process when the thread call stack data matches the whitelisted call signature.

8. The method of claim 1, further comprising:
determining that the first process is not associated with the first user interaction; and
causing an action to be performed based on determining that the first process is not associated with the first user interaction,
wherein the action includes:
denying access to the data file to the first process,
deleting the data file,
quarantining the data file, or
generating and sending an alert.

9. A device, comprising:
one or more memories; and
one or more processors, communicatively coupled to the one or more memories, to:
obtain user activity data associated with a plurality of processes being run by the device,
wherein the user activity data identifies user interactions with one or more user input devices,
wherein the plurality of processes is associated with a plurality of process identifiers, and
wherein the user activity data is associated with the plurality of process identifiers;
obtain historic data,
wherein the historic data includes a plurality of file identifiers associated with a plurality of data files previously accessed by a plurality of past processes, and
wherein the plurality of past processes corresponds to a plurality of past process identifiers;
detect an attempt to access a data file of a file system,
wherein the attempt is initiated by a first process having a first process identifier;
obtain a file identifier associated with the data file;
compare the first process identifier and the plurality of process identifiers to determine whether the first process is associated with a first user interaction included in the user activity data;
compare the file identifier and the plurality of file identifiers to determine whether the file identifier is associated with a past process identifier;
compare the first process identifier and the past process identifier to determine whether the first process identifier matches the past process identifier based on a result of comparing the file identifier and the past process identifier; and
selectively grant access to the data file to the first process based on a first result of determining whether the first process is associated with the first user interaction, or a second result of determining whether the first process identifier matches the past process identifier.

10. The device of claim 9, wherein the one or more user input devices include:
   a keyboard,
   a mouse,
   a microphone, or
   a touch screen.

11. The device of claim 9, wherein the data file is associated with a document, a spreadsheet, a data structure, an electronic-mail message, a video, or an image.

12. The device of claim 9, wherein the one or more processors are further configured to:
   obtain command-line data,
      wherein the command-line data includes a portion of computer code used to initiate the first process;
   determine that a second process invoked the first process based on the command-line data,
      wherein the second process is associated with a second process identifier;
   compare the second process identifier and the plurality of process identifiers;
   determine whether the second process is associated with a second user interaction included in the user activity data based on a third result of comparing the second process identifier and the plurality of process identifiers; and
   selectively grant access to the data file to the first process based on determining whether the second process is associated with the second user interaction.

13. The device of claim 9, wherein the one or more processors are further configured to:
   obtain a list of non-interactive process identifiers,
      wherein non-interactive process identifiers, included in the list of non-interactive process identifiers, are associated with whitelisted call signatures;
   compare the first process identifier and the non-interactive process identifiers to determine whether the first process identifier is associated with a whitelisted call signature;
   obtain thread call stack data associated with the first process identifier based on determining whether the first process identifier is associated with the whitelisted call signature;
   compare the thread call stack data and the whitelisted call signature; and
   grant access to the data file to the first process when the thread call stack data matches the whitelisted call signature.

14. The device of claim 9, wherein the one or more processors are further configured to:
   deny access to the data file to the first process based on the first result or the second result; and
   cause an action to be performed based on denying access to the data file.

15. The device of claim 14, wherein the action includes:
   deleting the data file,
   quarantining the data file, or
   generating and sending an alert.

16. A non-transitory computer-readable medium storing instructions, the instructions comprising:
   one or more instructions that, when executed by one or more processors, cause the one or more processors to:
      obtain user activity data associated with a plurality of processes being run by a device,
         wherein the user activity data identifies user interactions with one or more user input devices,
         wherein the plurality of processes is associated with a plurality of process identifiers, and
         wherein the user activity data is associated with the plurality of process identifiers;
      detect an attempt to access a data file of a file system,
         wherein the attempt is initiated by a first process having a first process identifier;
      obtain command-line data,
         wherein the command-line data includes a portion of computer code used to initiate the first process to access the data file;
      determine that a second process invoked the first process based on the command-line data,
         wherein the second process is associated with a second process identifier;
      compare the first process identifier and the plurality of process identifiers to determine whether the first process is associated with a first user interaction included in the user activity data;
      compare the second process identifier and the plurality of process identifiers to determine whether the second process is associated with a second user interaction included in the user activity data; and
      selectively grant access to the data file to the first process based on a first result of determining whether the first process is associated with the first user interaction, or a second result of determining whether the second process is associated with the second user interaction.

17. The non-transitory computer-readable medium of claim 16, wherein the one or more instructions, when executed by the one or more processors, further cause the one or more processors to:
   obtain a file identifier associated with the data file;
   determine whether a portion of the file identifier is present in the command-line data; and
   grant access to the data file to the first process based on the second result of determining that the second process is associated with the second user interaction, and a third result of determining that the portion of the file identifier is present in the command-line data.

18. The non-transitory computer-readable medium of claim 16, wherein the one or more instructions, when executed by the one or more processors, further cause the one or more processors to:
   deny access to the data file to the first process based on the first result or the second result; and
   cause an action to be performed based on denying access to the data file.

19. The non-transitory computer-readable medium of claim 18, wherein the action includes:
   deleting the data file,
   quarantining the data file, or
   generating and sending an alert.

20. The non-transitory computer-readable medium of claim 16, wherein the data file is associated with a document, a spreadsheet, a data structure, an electronic-mail message, a video, or an image.

* * * * *